United States Patent
Hide et al.

(10) Patent No.: US 10,564,296 B2
(45) Date of Patent: Feb. 18, 2020

(54) DISTRIBUTED KALMAN FILTER ARCHITECTURE FOR CARRIER RANGE AMBIGUITY ESTIMATION

(71) Applicant: u-blox AG, Thalwil (CH)

(72) Inventors: Christopher David Hide, Reigate (GB); Alexander James Parkins, Reigate (GB)

(73) Assignee: u-blox AG, Thalwil (CH)

( * ) Notice: Subject to any disclaimer, the term of this patent is extended or adjusted under 35 U.S.C. 154(b) by 346 days.

(21) Appl. No.: 15/784,452

(22) Filed: Oct. 16, 2017

(65) Prior Publication Data

US 2018/0180743 A1  Jun. 28, 2018

(30) Foreign Application Priority Data

Dec. 23, 2016  (EP) .................................... 16206872

(51) Int. Cl.
*G01S 19/44* (2010.01)
*G01S 19/13* (2010.01)

(52) U.S. Cl.
CPC .............. *G01S 19/44* (2013.01); *G01S 19/13* (2013.01)

(58) Field of Classification Search
CPC .......... G01S 19/44; G01S 19/13; G01S 19/32; G01S 19/43; G01S 19/04; G01S 19/36

(Continued)

(56) References Cited

U.S. PATENT DOCUMENTS 5,451,964 A  9/1995  Babu
5,991,691 A * 11/1999  Johnson ................... G01S 19/15
                                                           342/357.27

(Continued)

FOREIGN PATENT DOCUMENTS

WO  WO 98/37433 A1  8/1998

OTHER PUBLICATIONS

European Extended Search Report, European Application No. 16206872.0, dated Jun. 27, 2017, 7 pages.

(Continued)

*Primary Examiner* — Harry K Liu
(74) *Attorney, Agent, or Firm* — Finnegan, Henderson, Farabow, Garrett & Dunner LLP

(57) ABSTRACT

Methods and apparatus for determining navigation data (124) using carrier range measurements obtained by a GNSS receiver for a plurality of GNSS satellites, the apparatus comprising: a first Kalman filter (100) configured to determine an a posteriori estimate of a first state vector based at least in part on a first set of GNSS measurements (104) obtained by the, and/or a further, GNSS receiver and an a priori estimate of the first state vector, the first state vector comprising carrier range ambiguity values relating to the plurality of GNSS satellites and a position of the, and/or the further, GNSS receiver; and a second Kalman filter (102) configured to determine an a posteriori estimate of a second state vector, which comprises the navigation data (124), based at least in part on a second set of GNSS measurements (106) obtained by the, and/or a further, GNSS receiver, an a priori estimate of the second state vector, and carrier range ambiguity data (126) based on the carrier range ambiguity values determined in the a posteriori estimate of the first state vector.

19 Claims, 5 Drawing Sheets

(58) Field of Classification Search
USPC .................................................. 342/357.27
See application file for complete search history.

(56) References Cited

U.S. PATENT DOCUMENTS

| | | | | |
|---|---|---|---|---|
| 8,818,720 B2* | 8/2014 | Veitsel | .................... | G01S 19/52 |
| | | | | 342/357.35 |
| 2011/0187590 A1* | 8/2011 | Leandro | .................. | G01S 19/40 |
| | | | | 342/357.27 |
| 2012/0286991 A1* | 11/2012 | Chen | ....................... | G01S 19/04 |
| | | | | 342/357.23 |
| 2014/0324291 A1* | 10/2014 | Jones | .................... | E02F 9/2045 |
| | | | | 701/41 |
| 2018/0059256 A1* | 3/2018 | Zhodzishsky | ........... | G01S 19/52 |

OTHER PUBLICATIONS

Levy, L.J., "The Kalman Filter: Navigation's Integration Workhorse," GPS World, Sep. 1997, pp. 65-71, vol. 8, No. 9.

\* cited by examiner

DISTRIBUTED KALMAN FILTER ARCHITECTURE FOR CARRIER RANGE AMBIGUITY ESTIMATION

TECHNICAL FIELD

The present invention relates to Kalman filters and in particular to distributed Kalman filter architectures for carrier range ambiguity estimation.

BACKGROUND

Global Navigation Satellite System (GNSS) receivers enable the accurate determination of user position by performing measurements on radio signals transmitted by at least four GNSS satellites. The distance to each satellite is determined by first measuring the time it takes for the radio signal to travel from the satellite to the receiver and then, converting this travel time into a corresponding "line-of-sight" distance by multiplying it with the speed of light.

Ranging measurements performed on the pseudorandom noise (PRN) code modulated onto the satellite signal's radio frequency (RF) carrier (hereafter carrier) are known as pseudorange measurements and can achieve positioning accuracy in the region of metres if biases and error sources are appropriately taken into account. However pseudorange measurements suffer from degraded accuracy and reliability in challenging multipath environments.

Performing ranging measurements on the carrier of the satellite signal rather than on its modulation offers greater robustness to multipath. These measurements, known as carrier phase or carrier range measurements can also be made more precisely and can thus achieve centimetre positioning accuracy if biases and errors are correctly accounted for. Errors in the GNSS receiver time can be removed by differencing between satellites whereas errors in the initial satellite phase offset can be removed by differencing between two receivers, i.e. the GNSS receiver and another GNSS receiver, e.g. a reference ground station.

Some GNSS receivers employ both pseudorange and carrier range measurements to provide redundancy and increase the number of observations for use in position calculations. In contrast to pseudorange measurements, carrier range measurements introduce an ambiguity into the ranging measurement. The periodic nature of the transmitted carrier frequency creates an integer ambiguity in the number of cycles between the satellite transmitting the signal and the GNSS receiver, where each cycle of a signal represents the distance travelled in one wavelength of the signal.

This carrier range ambiguity arises because the GNSS receiver typically aligns a locally generated carrier signal with the incoming intercepted carrier signal to determine the carrier phase offset and this process provides no information on the whole number of signal cycles which have transpired since the signal was transmitted by the satellite. In order to use the carrier phase measurements made by the GNSS receiver as true ranging information, the unknown ambiguity first needs to be determined for each received satellite signal.

One known method for resolving these ambiguities entails the use of, what has justifiably been referred to as "navigation's integration workhorse" (L. J. Levy, GPS World, September 1977), a Kalman filter to estimate the ambiguities. Since Kalman filters are nowadays anyway frequently used in GNSS receivers to provide the navigation solution, they are the optimal approach for resolving the carrier range ambiguities. The Kalman filter employs differences in the pseudorange and carrier phase double difference measurements in addition to changing GNSS receiver-satellite geometry to build up position information which can be subsequently used to converge on the ambiguities. Rather than using double differencing, it is also possible to use single "differenced" measurements in the Kalman filter and estimate the receiver hardware delays.

Using a Kalman filter to estimate the carrier range ambiguities in this way requires implementing a separate Kalman filter state for each observed carrier range and consequently greatly increases the dimensions of the Kalman filter matrices which in turn increases non-linearly the computational cost of the Kalman filter algorithms. For example, modifying a typical navigation Kalman filter to include estimating the carrier range ambiguities would increase the number of states in the Kalman filter from 8 (3 position states, 3 velocity states and 2 clock states) to $8+2*C*M$, where C is the number of dual-frequency GNSS constellations; and M represents the number of visible satellite signals per constellation observable at any given time. Even in the case where only 5 satellites/constellation are visible at any one time and the GNSS receiver is capable of tracking just two GNSS constellations (e.g. GPS and GLONASS), the number of states required in the Kalman filter increases from 8 states to 28 states. This poses problems for implementation on GNSS receivers with constrained processing resources.

It would be desirable to provide a computationally efficient Kalman filter for resolving carrier range ambiguities in resource constrained GNSS receivers.

SUMMARY

In a first aspect of the invention there is provided an apparatus for determining navigation data using carrier range measurements obtained by a GNSS receiver for a plurality of GNSS satellites, the apparatus comprising: a first Kalman filter configured to determine an a posteriori estimate of a first state vector based at least in part on a first set of GNSS measurements obtained by the, and/or a further, GNSS receiver and an a priori estimate of the first state vector, the first state vector comprising carrier range ambiguity values relating to the plurality of GNSS satellites and a position of the, and/or the further, GNSS receiver; and a second Kalman filter configured to determine an a posteriori estimate of a second state vector, which comprises the navigation data, based at least in part on a second set of GNSS measurements obtained by the, and/or a further, GNSS receiver, an a priori estimate of the second state vector, and carrier range ambiguity data based on the carrier range ambiguity values determined in the a posteriori estimate of the first state vector.

Optionally, the first Kalman filter is configured to determine the a priori estimate of the first state vector based on at least one of a velocity estimate for the, and/or the further, GNSS receiver and a measure of uncertainty relating to the velocity estimate, each determined by the second Kalman filter.

The second Kalman filter may be configured to determine the velocity estimate and/or the measure of uncertainty based on data obtained by one or more sensors and that is indicative of motion and/or orientation of the, and/or the further, GNSS receiver.

Optionally, the second Kalman filter is configured to determine the velocity estimate and/or the measure of uncertainty based on the a priori estimate of the second state vector and one or more measurements obtained by one or more sensors and indicative of a speed of the, or the further, GNSS receiver.

In some arrangements, when determining the a posteriori estimate of the first state vector, the first Kalman filter is configured to determine estimated first measurement residuals for the first Kalman filter based on second measurement residuals for the second Kalman filter.

In other arrangements, the first Kalman filter is further configured to estimate the first measurement residuals based on Kalman filter parameters of the second Kalman filter, at least part of the a priori estimate of the second state vector and at least part of the a priori estimate of the first state vector.

The first Kalman filter could be configured to determine the a posteriori estimate of the first state vector at a first update rate, and wherein the second Kalman filter is configured to determine the a posteriori estimate of the second state vector at a second update rate.

The second update rate may be greater than the first update rate.

Optionally, the second Kalman filter is configured to determine the a priori estimate of the second state vector based on inertial measurements obtained by one or more inertial sensors and indicative of acceleration and/or angular rate of rotation of the, or the further, GNSS receiver.

One of the first or second sets of GNSS measurements could comprise at least one GNSS measurement not included in the other of the first or second sets of GNSS measurements.

The apparatus may comprise two GNSS receivers, and wherein the first and second sets of GNSS measurements each comprise GNSS measurements obtained by the two GNSS receivers.

In some arrangements, the apparatus may further comprise first and second processors, wherein the first processor is configured to implement the first Kalman filter and the second processor is configured to implement the second Kalman filter.

In other arrangements, the apparatus may further comprise further comprising an ambiguity resolution module configured to resolve the carrier range ambiguity values determined in the a posteriori estimate of the first state vector to integers, and wherein the carrier range ambiguity data comprises the resolved integer carrier range ambiguity values.

Optionally, the first state vector comprises atmospheric correction values relating to the plurality of GNSS satellites.

The carrier range ambiguity data may comprise the carrier range ambiguity values and the atmospheric correction values, and wherein the second Kalman filter is configured to adjust the carrier range ambiguity values based on the atmospheric correction values.

Optionally, the first Kalman filter is configured to adjust the carrier range ambiguity values based on the atmospheric correction values, and wherein the carrier range ambiguity data comprises the adjusted carrier range ambiguity values.

Some exemplary apparatus may further comprise one or more further Kalman filters configured to determine an a posteriori estimate of one or more further state vectors based at least in part on further GNSS measurements obtained by the, and/or a further, GNSS receiver and one or more a priori estimates of the one or more further state vectors, the one or more further state vectors comprising further carrier range ambiguity values relating to the plurality of GNSS satellites, and wherein the carrier range ambiguity data is also based on the further carrier range ambiguity values.

According to the invention in a further aspect, there is provided a method for determining navigation data using carrier range measurements obtained by a GNSS receiver for a plurality of GNSS satellites, the method comprising: determining, by a first Kalman filter an a posteriori estimate of a first state vector based at least in part on a first set of GNSS measurements obtained by the, and/or a further, GNSS receiver and an a priori estimate of the first state vector, the first state vector comprising carrier range ambiguity values relating to the plurality of GNSS satellites and a position of the, and/or the further, GNSS receiver; and determining, by a second Kalman filter an a posteriori estimate of a second state vector, which comprises the navigation data, based at least in part on a second set of GNSS measurements obtained by the, and/or a further, GNSS receiver, an a priori estimate of the second state vector, and carrier range ambiguity data based on the carrier range ambiguity values determined in the a posteriori estimate of the first state vector.

Optionally, the first Kalman filter determines the a priori estimate of the first state vector based on at least one of a velocity estimate for the, and/or the further, GNSS receiver and a measure of uncertainty relating to the velocity estimate, each determined by the second Kalman filter.

The second Kalman filter may determine the velocity estimate and/or the measure of uncertainty based on data obtained by one or more sensors and that is indicative of motion and/or orientation of the, and/or the further, GNSS receiver.

The second Kalman filter could determine the velocity estimate and/or the measure of uncertainty based on the a priori estimate of the second state vector and one or more measurements obtained by one or more sensors and indicative of a speed of the, or the further, GNSS receiver.

Optionally, when determining the a posteriori estimate of the first state vector, the first Kalman filter determines estimated first measurement residuals for the first Kalman filter based on second measurement residuals for the second Kalman filter.

In some arrangements, the first Kalman filter estimates the first measurement residuals based on Kalman filter parameters of the second Kalman filter, at least part of the a priori estimate of the second state vector and at least part of the a priori estimate of the first state vector.

Optionally, the first Kalman filter determines the a posteriori estimate of the first state vector at a first update rate, and wherein the second Kalman filter determines the a posteriori estimate of the second state vector at a second update rate.

The second update rate might be greater than the first update rate.

The second Kalman filter can determine the a priori estimate of the second state vector based on inertial measurements obtained by one or more inertial sensors and indicative of acceleration and/or angular rate of rotation of the, or the further, GNSS receiver.

Optionally, one of the first or second sets of GNSS measurements comprise at least one GNSS measurement not included in the other of the first or second sets of GNSS measurements.

The method may further comprise obtaining GNSS measurements using two GNSS receivers, and wherein the first and second sets of GNSS measurements each comprise GNSS measurements obtained by the two GNSS receivers.

The method may further comprise implementing the first Kalman filter on first processor and implementing the second Kalman filter on a second processor.

The method may further comprise an ambiguity resolution module resolving the carrier range ambiguity values determined in the a posteriori estimate of the first state vector to integers, and wherein the carrier range ambiguity data comprises the resolved integer carrier range ambiguity values.

Optionally, the first state vector comprises atmospheric correction values relating to the plurality of GNSS satellites.

The carrier range ambiguity data may comprise the carrier range ambiguity values and the atmospheric correction values, and wherein the second Kalman filter adjusts the carrier range ambiguity values based on the atmospheric correction values.

Optionally, the first Kalman filter adjusts the carrier range ambiguity values based on the atmospheric correction values, and wherein the carrier range ambiguity data comprises the adjusted carrier range ambiguity values.

The method may further comprise one or more further Kalman filters determining an a posteriori estimate of one or more further state vectors based at least in part on further GNSS measurements obtained by the, and/or a further, GNSS receiver and one or more a priori estimates of the one or more further state vectors, the one or more further state vectors comprising further carrier range ambiguity values relating to the plurality of GNSS satellites, and wherein the carrier range ambiguity data is also based on the further carrier range ambiguity values.

According to the invention in a further aspect, there is provided a computer program comprising instructions which, when executed on at least one processor, cause the at least one processor to carry out any method disclosed herein.

According to the invention in a further aspect, there is provided a carrier containing the computer program above, wherein the carrier is one of an electronic signal, optical signal, radio signal, or non-transitory computer readable storage medium.

BRIEF DESCRIPTION OF THE DRAWINGS

Embodiments of the invention will now be described, by way of example only, by reference to the accompanying drawings, in which.

DETAILED DESCRIPTION

Described herein are methods for reducing the computational burden of Kalman filters which estimate carrier range ambiguities thus permitting their implementation in resource constrained environments.

Separation of Carrier Range Ambiguities

Figure 1:
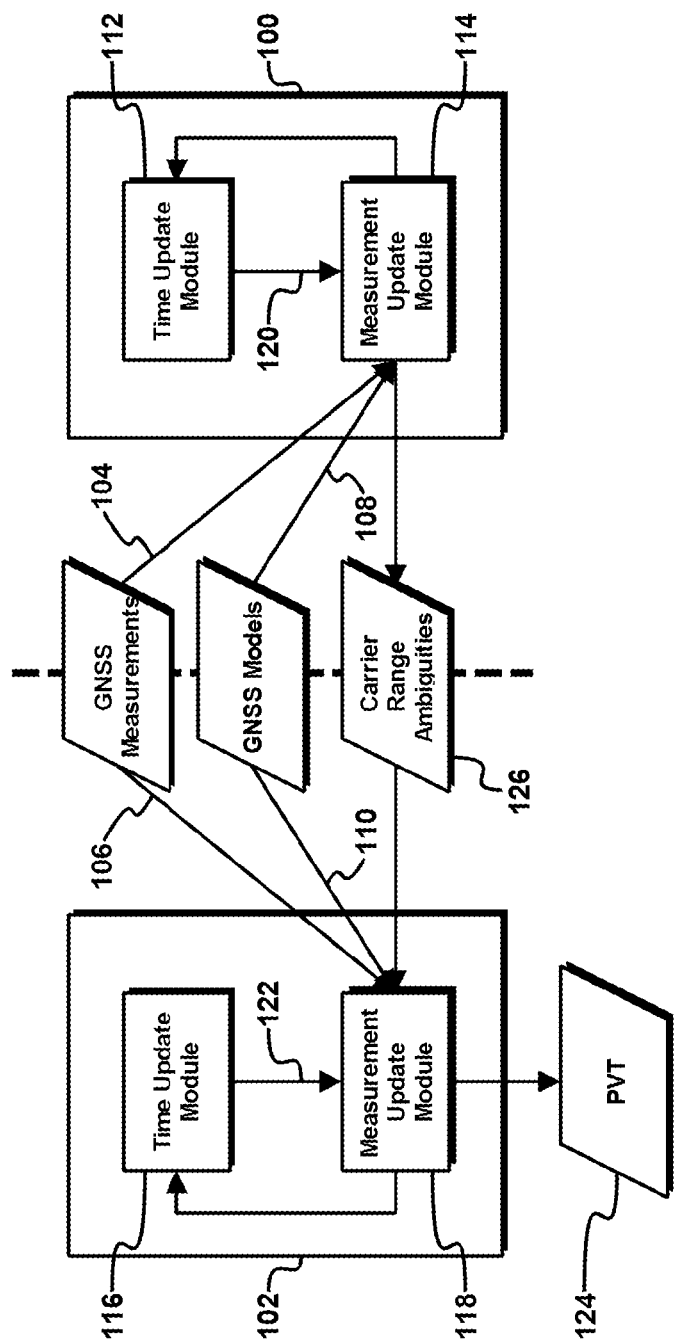
FIG. 1 is a block diagram of a distributed Kalman filter for carrier range ambiguity estimation.

FIG. 1 is a block diagram of an exemplary apparatus capable of outputting a high-precision navigation solution, e.g. from GNSS measurement, without requiring computation intensive implementation. The apparatus comprises a first Kalman filter 100 and a second Kalman filter 102. The first and second Kalman filters 100, 102 respectively, receive GNSS measurements 104, 106 and GNSS model information 108, 110 which consequently enables the Kalman filters 100, 102 to estimate one or more states of a process as will be discussed herein.

The first Kalman filter 100 comprises a time update module 112 and a measurement update module 114, and the second Kalman filter 102 comprises a time update module 116 and measurement update module 118. The time update module 112 of the first Kalman filter 100 and time update module 116 of the second Kalman filter 102 project forward in time one or more current state estimates along with corresponding error covariance estimates to obtain a priori estimates 120, 122 for the next time step k according to:

$$\hat{x}_k^- = A\hat{x}_{k-1} + B\mu_{k-1} \quad (1)$$

$$P_k^- = AP_{k-1}A^T + Q \quad (2)$$

Where $\hat{x}_k^-$ represents the a priori estimate of the one or more states and $P_k^-$ represents the a priori estimate of the covariance of each modelled state for the next time step k. $\hat{x}_{k-1}$ in equation (1) denotes the estimate of the one or more Kalman filter states from the previous time step k−1 and A is the state transition matrix which relates the states at the previous time step k−1 to the state at the current time step k. An optional control input $\mu_{k-1}$ may be present to provide additional information for the state prediction and this is related to the one or more states via the control input matrix B. As explained in more detail below, the control input may comprise inertial sensor measurements that can be used to improve one or both of the a priori estimate 120, 122.

Equation (2) shows that time update modules 112 and 116 predict the error covariance of each state in respective Kalman filters for the next time step k based on the estimates of each error covariance from a previous time step k−1, $P_{k-1}$. Note that state transition matrix A and its transpose, $A^T$ are used in the calculation along with the noise covariance for the process, Q.

The estimates of the one of more predicted states and the covariances associated with each of these states are termed "a priori" estimates because they occur ahead of measurements for the current time step k. In other words, the estimates are made before any GNSS (and/or optionally speed measurements) measurements are taken into account. The a priori estimates 120, 122 predicted in the time update modules 112 and 116 are passed to measurement update modules 114 and 118 of the first and second Kalman filters 100, 102, respectively.

The measurement update modules 114 and 118 of the first Kalman filter 100 and second Kalman filter 102, respectively, determine an a posteriori estimate $\hat{x}_k$ of the states according to:

$$\hat{x}_k = \hat{x}_k^- K_k(z_k - H\hat{x}_k^-) \quad (3)$$

As shown by equation (3), the a posterior estimate of the states is based on a linear combination of the a priori estimate of the states $\hat{x}_k^-$ obtained from the respective time update module, 112 and 116, and a weighted difference between one or more measurements at time step k, $z_k$, and a measurement prediction $H\hat{x}_k^-$. The difference term $z_k - H\hat{x}_k^-$ is the measurement residual for each state, sometimes also known as the measurement innovations. The measurement residuals reflect the discrepancy between the predicted measurement $H\hat{x}_k^-$ and the actual measurement $z_k$. H denotes the measurement matrix, also known as the design matrix, and specifically relates the states in the state vector to the one or more measurements $z_k$.

Before the measurement residual for each state can be determined, the weighting factor first needs to be computed. The weighting factor, or Kalman gain $K_k$ as it is sometimes referred, is determined by $$K_k = P_{\bar{k}} H^T (H P_{\bar{k}} H^T + R)^{-1} \quad (4)$$

Where H denotes the measurement matrix introduced earlier and R is the error covariance of the measurements. The measurement update modules 114 and 118 of the first Kalman filter 100 and second Kalman filter 102, respectively, also determine a posterior estimate of the error covariance for each state according to $$P_k = (I - K_k H) P_{\bar{k}} \quad (5)$$

The measurement update performed in each measurement update module 114 and 118 need not be performed for each state variable in one step. For instance the measurement update could be performed separately for one or more state variables by appropriate decomposition of the state matrix as shown in equations (6) and (7).

$$\bar{p}_k = \bar{p}_{\bar{k}} + K_k (z_k - H \bar{p}_{\bar{k}}) \quad (6)$$

$$\bar{v}_k = \bar{v}_{\bar{k}} + K_k (z_k - H \bar{v}_{\bar{k}}) \quad (7)$$

Here ρ and v refer to the states denoting position and velocity, respectively, assuming these states are present in the state vector.

After each update in the time update modules 112 and 116 and the measurement update modules 114 and 118, the process is repeated with the a posteriori estimates at time step k becoming previous a posteriori estimates in the next iteration and consequently they are used to project forward new a priori estimates in the new time step k. Thus the Kalman filter recursively conditions the current estimate of the states and covariances on all past measurements. Note at the very first time step when the Kalman filter starts, estimates from a previous iteration are not available and thus initial estimates of the states and covariances for these states need to be fed into the Kalman filters.

In the exemplary apparatus of FIG. 1, the state vector of the first Kalman filter 100 (the first state vector) comprises an estimate of the carrier range ambiguity for each of a plurality of GNSS satellites from which a first set of GNSS measurements 104 have been received. The first state vector also comprises an estimate of a position of a GNSS receiver associated with the apparatus.

The state vector of the second Kalman filter 102 (the second state vector) comprises an estimate of position, velocity and time (receiver clock offset and drift), also known as PVT 124, for a GNSS receiver associated with the apparatus and is determined based on a second set of GNSS measurements 106.

It is noted that exemplary methods and apparatus disclosed herein may use a plurality of GNSS receivers, which may be configured to obtain GNSS measurements from a specific GNSS constellation and/or in a specific band, such as L1 and L2 for the Naystar GPS. Each of the first and second sets of GNSS measurements may comprise GNSS measurements from one or more of the plurality of GNSS receivers. Accordingly, the positions determined in the first and second state vectors of the first and second Kalman filters may relate to any one of a plurality of GNSS receivers. In practical implementations using a plurality of GNSS receivers, the plurality of GNSS receivers may be considered substantially collocated within the context of an achievable position accuracy and the position of one GNSS receiver may therefore be approximated to be the same as the position of another GNSS receiver. For the remainder of this document, we refer to the position of "the receiver", but this should be understood as meaning the position of one of a plurality of receivers, where appropriate, or the position of the apparatus in which the plurality of GNSS receivers are located.

In specific methods and apparatus, the first and second sets of GNSS measurements 104, 106 may comprise different GNSS measurements. That is, at least one GNSS measurement in the first set of GNSS measurements might not be present in the second set of GNSS measurements and/or vice versa.

Further, the first and second Kalman filters 100, 102 may be implemented on separate processors. The separate processors may form part of separate receiver chips that each include a GNSS receiver. The receiver chips may be incorporated into an integrated circuit design.

As shown schematically in FIG. 1, the second Kalman filter 102 receives carrier range ambiguity data 126, which is based on carrier range ambiguity values estimated in the first Kalman filter 100. The second Kalman filter 102 receives the carrier range ambiguity data as measurements into the measurement update module 118. The second Kalman filter 102 is therefore able to determine the a posteriori estimate of second state vector based on the carrier range ambiguities without having to estimate them as state variables. This means that the computational burden for implementing the second Kalman filter 102 is significantly reduced over the computational burden for implementing a larger Kalman filter that estimates PVT and the carrier range ambiguities. This allows the second Kalman filter 102 to be implemented on a less powerful processor and may also allow the second Kalman filter 102 to update at a different (e.g. higher) update rate than the first Kalman filter 100. Therefore, navigation data (i.e. PVT 124) output from the second Kalman filter 102 can be at a rate at which navigation data is required by a user or, for example, by other systems on a vehicle, whereas the carrier range ambiguities, which are fixed (neglecting cycle slips), not required in the navigation data and are computationally intensive to determine, can be determined at a slower rate.

It is also noted that each of the first and second Kalman filters 100, 102 independently estimates position, in that position is estimated in each Kalman filter using separate time update and measurement update modules. Whilst in some exemplary apparatus discussed below, certain parameters and/or variables may be passed from the second Kalman filter 102 to the first Kalman filter 100, there remains some independence in the time updates and/or measurement updates of each.

The carrier range ambiguity data 126 need not comprise information pertaining only to the ambiguities of the carrier range measurements. For example the first Kalman filter 100 may estimate parameters in addition to the carrier range ambiguities used in the second Kalman filter 102 to improve estimation of one or more states in the second state vector e.g. position. These parameters however must not change significantly over short time periods, due to the latency between estimation in the first Kalman filter 100 and use in the second Kalman filter 102. They could be used explicitly in the second Kalman filter 102, or combined with the carrier range ambiguities to form a carrier range bias parameter. An example would be the estimation of atmospheric effects, for instance slant ionospheric delays using multi-frequency data. Estimating these adds one additional state per satellite, which would significantly expand the number of estimated states in the second Kalman filter 102. However, the ionospheric delay usually only changes slowly, so these parameters could be added to the first filter Kalman 100 to be estimated along with the ambiguities, then passed to the second Kalman filter 102 improve the estimation of one or more states in the second state vector.

Figure 2:
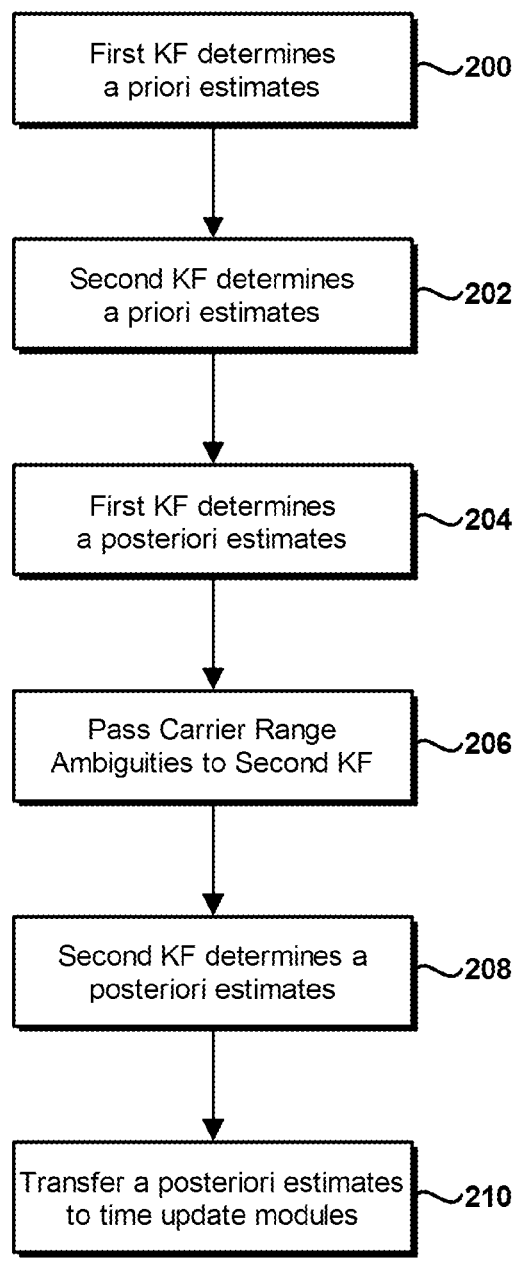
FIG. 2 is a flow chart showing a method for determining navigation data.

FIG. 2 shows a flow diagram of a method for determining navigation data, e.g. a PVT solution using carrier range measurements obtained by at least one GNSS receiver. FIG. 2 is described below with reference also to FIG. 1.

Step 200: The time update module 112 of the first Kalman filter 100 determines a priori estimates 120 of the first state vector $\hat{x}_k^{1-}$ and the associated error covariance $P_k^{1-}$. The superscript "1" denotes the first Kalman filter 100.

As explained above, the a priori estimate of the first state vector $\hat{x}_k^{1-}$ is determined using equation (1) and the a priori estimate of the covariance $P_k^{1-}$ is determined using equation (2).

Step 202: The time update module 116 of the second Kalman filter 102 determines a priori estimates 122 of the second state vector $\hat{x}_k^2$ and the associated error covariance $P_k^{2-}$. The superscript "2" denotes the second Kalman filter.

As with the first Kalman filter 100, the a priori estimates 122 are determined in the second Kalman filter 102 using equations (1) and (2).

In exemplary arrangements, the a priori estimates of the first and/or second state vectors $\hat{x}_k^{1-}$, $\hat{x}_k^{2-}$ are determined using measurements obtained by one or more sensors, such as inertial sensors. Inertial sensor measurements may be included in equation (1) as the control input $\mu_{k-1}$, along with an appropriate control input matrix B. It is noted however, that other measurements may be used as the control input $\mu_{k-1}^1$. $\mu_{k-1}^2$ instead of or in addition to the inertial measurements. Further, one or both of the control inputs $\mu_{k-1}^2$, $\mu_{k-1}^2$ may be set to zero if no measurements are used in the determination of the a priori estimates of the first and/or second state vectors.

Step 204: The measurement update module 114 of the first Kalman filter 100 determines an a posteriori estimate of the first state vector $\hat{x}_k^1$ and the associated error covariance $P_k^1$. As discussed above, this may be done using equations (3), (4) and (5) using the a priori estimate 120 of the first state vector $\hat{x}_k^{1-}$ and the associated a priori estimate of the error covariance $P_k^{1-}$ from the time update module 112, along with a first set of GNSS measurements 104, which form at least part of $z_k^1$ and relate to a plurality of GNSS satellites. The first set of GNSS measurements 104 may have been obtained by one or more GNSS receivers.

The measurement update module 114 of the first Kalman filter 100 may also receive GNSS model data 108 relating to the plurality of satellites. The GNSS model data 108 may be used to mitigate or remove error sources in the first set of GNSS measurements 104, for example by accounting for atmospheric corrections. In addition, satellite-satellite differencing techniques may be employed to mitigate or remove error sources from the first set of GNSS measurements.

The a posteriori estimate of the first state vector comprises at least an estimate of position and an estimate of the carrier range ambiguity for each of the plurality of GNSS satellites. Estimating position in the first state vector allows the use of geometry based techniques for determining the carrier range ambiguities.

Step 206: Carrier range ambiguity data 126, which in this case comprises the estimated carrier range ambiguities is passed from the measurement update module 114 of the first Kalman filter 100 to the measurement update module 118 of the second Kalman filter 102.

Step 208: The measurement update module 118 of the second Kalman filter 102 determines an a posteriori estimate of the second state vector $\hat{x}_k^2$. As with the first Kalman filter 100, this may be done using equations (3), (4) and (5) above using the a priori estimates 122 of the second state vector $\hat{x}_k^{2-}$ and the associated a priori estimate of the error covariance $P_k^{2-}$ from the time update module 116, along with a second set of GNSS measurements 106, which form part of $z_k^2$ and relate to a plurality of GNSS satellites and the carrier range ambiguity data 126 from step 206. The measurement update module 118 may also receive GNSS model data 110, which it may use in a similar way to the first Kalman filter 100 to correct and/or mitigate one or more GNSS error sources. In other words, the measurement update module 118 receives the carrier range ambiguity data 126 from the measurement update module 114 and these are added to $z_k^2$ along with the second set of GNSS measurements 110.

The a posteriori estimate of the second state vector may be output as PVT 124.

Step 210: The measurement update modules 114, 118 transfer the a posteriori estimates $\hat{x}_k^1$, $\hat{x}_k^2$ to the time update modules 112, 116 respectively, where they are used as $\hat{x}_{k-1}^1$, and $\hat{x}_{k-1}^2$ for the next iteration of the Kalman filters 100, 102.

The measurement update modules 114, 118 of the first and/or second Kalman filters 100, 102 may also receive further measurements from one or more sensors, such as a speed sensor or an odometer, that are indicative of a speed of the GNSS receiver (or a vehicle to which the apparatus is fitted). In one specific embodiment, a number of revolutions of a wheel of a vehicle (also sometimes known as wheel ticks) that occur in a given time period may be used as a measurement indicative of speed in the first and/or second Kalman filters 100, 102. If such measurements are used then they are added to the measurement vector, $z_k$ of the respective Kalman filter.

It is noted that the flow diagram shown in FIG. 2 is illustrative only and that the various steps of the flow need not be undertaken in that order. It is also noted that the flow diagram of FIG. 2 assumes that the first and second Kalman filters 100, 102 are being updated at the same time. However, in exemplary implementations, the first and second Kalman filters 100, 102 may update at a first update rate and a second update rate respectively and the second update rate may be greater than the first. In such cases, the measurement update module 118 of the second Kalman filter 102 uses the most recent carrier range ambiguity data 126 determined by the first Kalman filter 100.

Modularity Through Velocity Control Input

Figure 3:
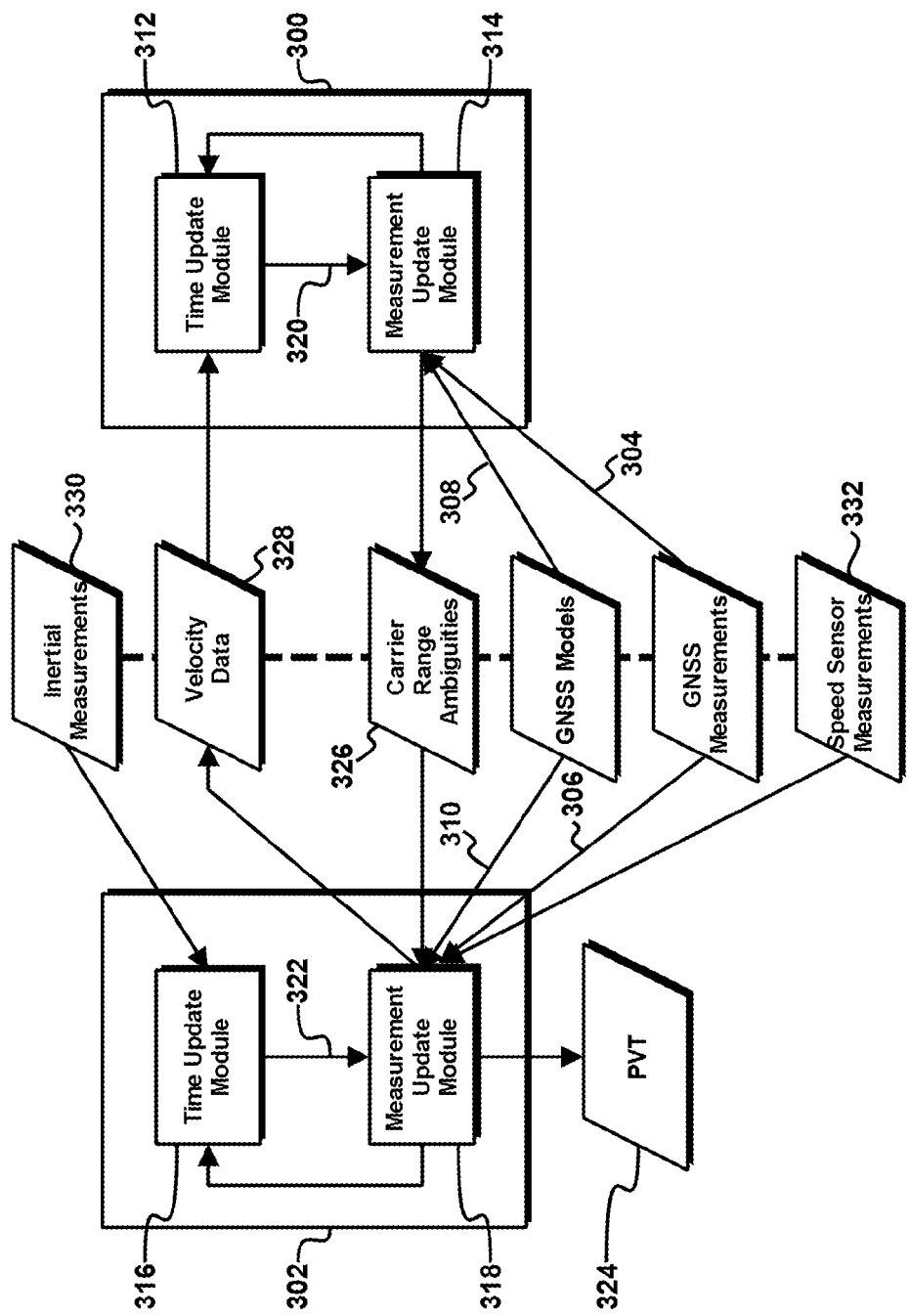
FIG. 3 is a further block diagram of a distributed Kalman filter for carrier range ambiguity estimation.

FIG. 3 shows an exemplary apparatus for determining navigation data using carrier range measurements obtained by a GNSS receiver and relating to a plurality of GNSS satellites. One or more features of FIG. 3 may have the same or a similar function as corresponding features of FIG. 1 and these are not explained again in detail here. Where possible, such features are identified by a corresponding reference numeral to that used in FIG. 1, but beginning with a "3" instead of a "1".

As described above, the measurement update in a Kalman filter may be undertaken in two or more steps, such that particular state variables may be determined independently. The apparatus of FIG. 2 uses this attribute of a Kalman filter as a means for the second Kalman filter 302 to provide velocity data 328, including a velocity estimate, to the first Kalman filter 300.

More specifically, in exemplary methods and apparatus, the second Kalman filter 302 determines the velocity data 328, which includes a velocity estimate and a measure of the uncertainty (e.g. an estimate of the error covariance) of the velocity estimate based on data obtained by one or more sensors 330, 332 and that is indicative of motion and/or orientation from a time update undertaken in the time update module as described above in connection with equations (1) and (2). The velocity data 328 is passed from the second Kalman filter to the time update module 312 of the first Kalman filter 300. The time update module 312 of the first Kalman filter 300 may then use the velocity estimate as a control input together with the measure of uncertainty when determining of the a priori estimate 320 of the first state vector. The control input matrix for the first Kalman filter 300 uses the velocity estimate to propagate the position estimates by multiplying the velocity estimate by the time between updates of the first Kalman filter 300 using the equation $$E = \begin{bmatrix} \tau & 0 & 0 \\ 0 & \tau & 0 \\ 0 & 0 & \tau \\ * & * & * \\ * & * & * \\ * & * & * \\ 0 & 0 & 0 \end{bmatrix}$$

Where r is the time between updates.

In this way, the first Kalman filter 300 does not need to be extended to support the integration of measurements from one or more sensors 330, 332 (e.g. inertial and/or speed sensors), as they are integrated in the second Kalman filter 302 and velocity data 328 is passed to the secondary filter. In addition, modularity is improved because improvements in the second Kalman filter 302, e.g. by using additional sensor measurements, are automatically realised in the first Kalman filter 300 without the need to implement modifications to the first Kalman filter 300.

FIG. 3 shows that the velocity data 328 is determined by the measurement update module 318 of the second Kalman filter 302 and passed to the time update module 312 of the first Kalman filter 300. In such arrangements, the time update module 316 of the second Kalman filter 302 determines a priori estimates 322 of the second state vector, which may or may not use inertial sensor measurements 330 as a control input, using equation (1) above, and the associated a priori estimate of the error covariance using equation (2) above.

The measurement update module 318 receives the a priori estimates 322 and speed sensor measurements 332 (e.g. wheel tick data) and performs a velocity measurement update based thereon and using equation 7 (copied below) to produce the velocity data 328, comprising the velocity estimate and optionally the error covariance of the velocity estimate. The second set of GNSS measurements 306 are not used in the velocity measurement update.

$$\hat{v}_k = \hat{v}_k^- + K_k(z_k - H\hat{v}_k^-)$$

The velocity data 328 is passed to the time update module 312 of the first Kalman filter 300. The time update module determines the a priori estimates 320 using equations (1) and (2), with the velocity estimate as the control input.

It is noted that in other arrangements, the time update module 316 of the second Kalman filter 302 may transfer the velocity data 328 to the time update module 312 of the first Kalman filter 300. In such arrangements, the time update module 316 determines the a priori estimates 322 using the inertial sensor measurements 330 as the control input and passes velocity data 328 from the a priori estimates 322 to the time update module 312 of the first Kalman filter 300.

The remainder of the operation of the apparatus of FIG. 3 is the similar to that discussed already in respect of FIGS. 1 and 2. The measurement update module 314 of the first Kalman filter 300 determines the a posteriori estimate of the first state vector based on the a priori estimate 320, the first set of GNSS measurements 304 and optionally the GNSS model data 308. The carrier range ambiguity data 326, which in this case comprises the carrier range ambiguities for the ranging measurements for each received GNSS satellite signal, is passed to the measurement update module 318 of the second Kalman filter 302. The measurement update module 318 determines the a posteriori estimate of the second state vector based on the a priori estimate 322, the speed sensor measurements 332, the second set of GNSS measurements 306, the carrier range ambiguity data 326 and optionally the GNSS model data 310.

Optimisation Through Adjustment of Measurement Residuals

Figure 4:
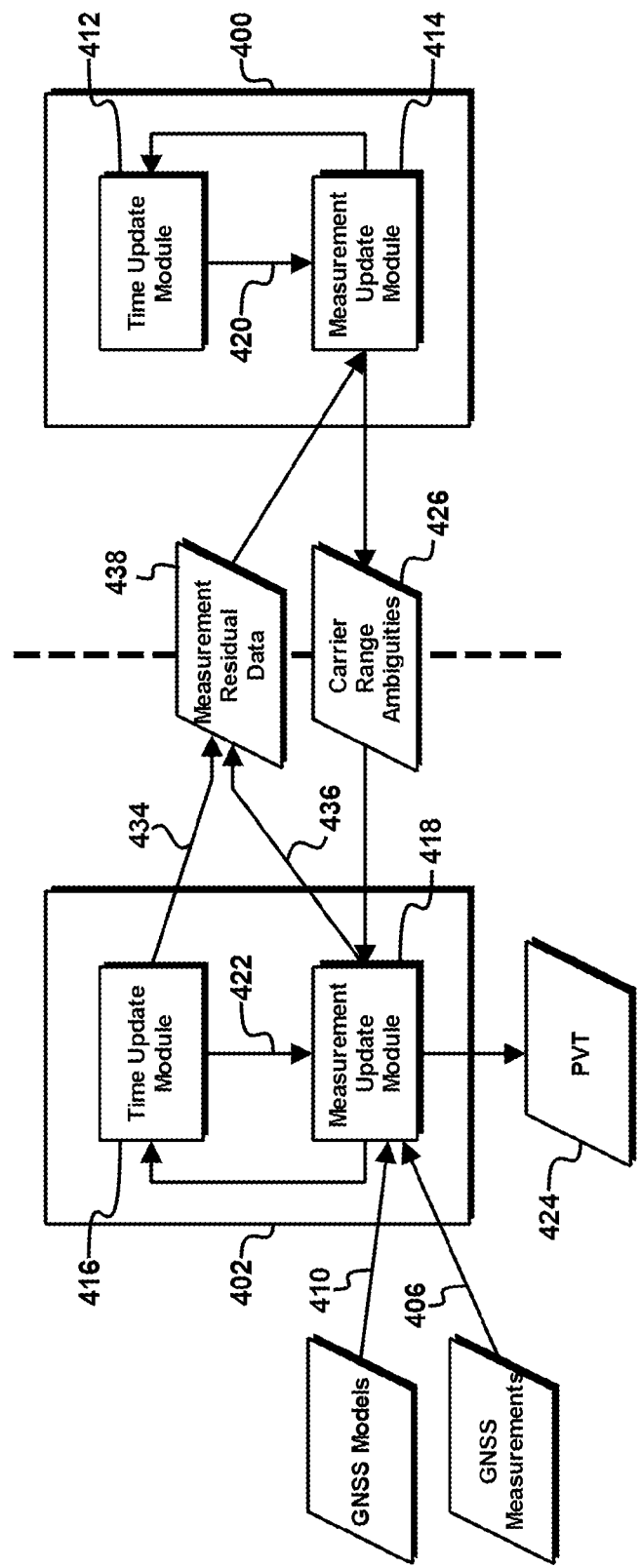
FIG. 4 is a further block diagram of a distributed Kalman filter for carrier range ambiguity estimation.

FIG. 4 shows an exemplary apparatus for determining navigation data using carrier range measurements obtained by a GNSS receiver and relating to a plurality of GNSS satellites. One or more features of FIG. 4 may have the same or a similar function as corresponding features of FIGS. 1 and 3 and these are not explained again in detail here. Where possible, such features are identified by a corresponding reference numeral to that used in FIG. 1, but beginning with a "4" instead of a "1".

As discussed above, the first Kalman filter 400 and second Kalman filter 402 are independent and estimate independent position solutions via a "position" state in their corresponding state vectors. However, it can be assumed that the difference between the position solutions estimated by each Kalman filter is small and this allows for the measurement residuals of the first Kalman filter (first measurement residuals) to be approximated based on the measurement residuals of the second Kalman filter (second measurement residuals).

In one exemplary arrangement, the time update module 416 of the second Kalman filter determines a priori estimates 422 of the second state vector, which may or may not include inertial sensor measurements, and an estimate of the covariance for each state in the second state vector. The time update module 416 of the second Kalman filter 402 passes an a priori estimate of one or more states from the second state vector to the measurement update module 414 of the first Kalman filter 400.

As discussed above, the measurement update module 418 of the second Kalman filter 402 determines an a posteriori estimate of the second state vector based on the a priori estimates 422, the second set of GNSS measurements 406, the carrier range ambiguity data 426 previously determined by the first Kalman filter 400 and optionally the GNSS model data 410.

In determining the a posteriori estimate of the second state vector, the measurement update module 418 determines Kalman filter parameters 436 for the second Kalman filter 402 and passes these to the measurement update module 414 of the first Kalman filter 400. In a specific example, the Kalman filter parameters comprise the measurement matrix H, of the second Kalman filter 402, the second measurement residuals and the measurement covariance matrix R. Together, the a priori estimate of one or more states of the second state vector and the Kalman filter parameters 436 form measurement residual data 438.

The measurement update module 414 of the first Kalman filter 400 receives the measurement residual data 438 from the second Kalman filter 402 and estimates the measurement residuals to be used in the first Kalman filter 400 using the following equation $$y^1 = y^2 + K^2 \hat{x}_k^{1-} - \hat{x}_k^{2-})$$

Where $y^1$ is the first measurement residuals for the first Kalman filter 400 and $y^2$ is the second measurement residuals.

The estimated first measurement residuals may be substituted into equation (3) above by the measurement update module 414 when determining the a posteriori estimate of the first state vector.

The arrangement shown in FIG. 4 reduces the amount of data that is required to be accessed by the first Kalman filter 400. For example, the first Kalman filter 400 does not need access to GNSS measurements or GNSS model data. However, it is noted that even though the first Kalman filter 400 does not directly receive GNSS measurements, the a posteriori estimate of the first Kalman filter 400 is based on GNSS measurements, as those GNSS measurements are used to determine the second measurement residuals, which in turn are used to determine the first measurement residuals. In such arrangements, the first set of GNSS measurements can be considered the same as the second set of GNSS measurements.

Optional Resolution of Carrier Range Ambiguities to Integers

Figure 5:
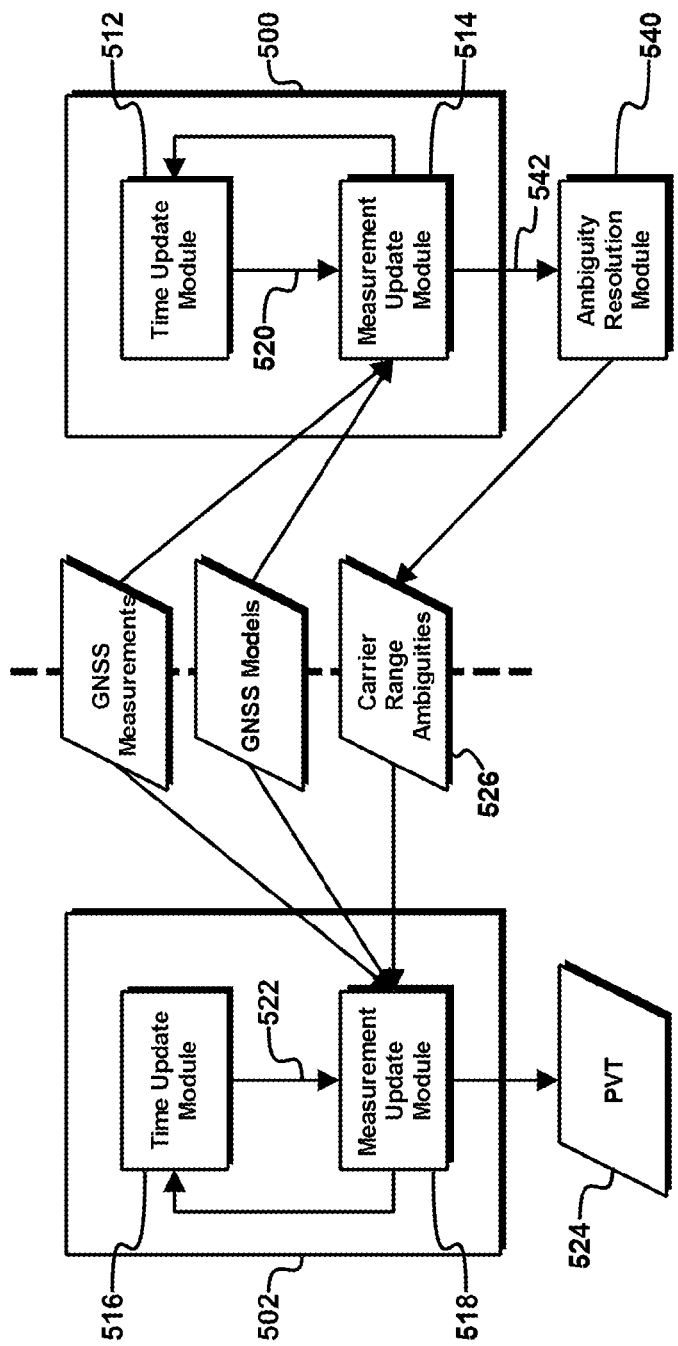
FIG. 5 is a further is a block diagram of a distributed Kalman filter for carrier range ambiguity estimation.

FIG. 5 shows an exemplary apparatus for determining navigation data using carrier range measurements obtained by a GNSS receiver and relating to a plurality of GNSS satellites. One or more features of FIG. 5 may have the same or a similar function as corresponding features of FIGS. 1, 3 and 4 and these are not explained again in detail here. Where possible, such features are identified by a corresponding reference numeral to that used in FIG. 1, but beginning with a "5" instead of a "1".

The apparatus of FIG. 5 includes an ambiguity resolution module 540. The ambiguity resolution module 540 may be included in any apparatus disclosed herein, specifically those shown in FIGS. 1, 3 and 4. FIG. 5 shows the ambiguity resolution module 540 used with the apparatus of FIG. 1, but this is exemplary only.

As shown in FIG. 5, the ambiguity resolution module 540 receives float carrier range ambiguity values 542 from the measurement update module 514, which estimates them as part of the a posteriori estimate of the second state vector. The ambiguity resolution module resolves the carrier range ambiguity values to integers using any known technique, such as the LAMBDA technique. The resolved integer carrier range ambiguity values are passed to the measurement update module 518 of the second Kalman filter as the carrier range ambiguity data 526.

Multiple carrier range ambiguity Kalman filters

Exemplary methods and apparatus may include multiple Kalman filters configured to determine an a posteriori estimate of a state vector including carrier range ambiguity values. That is, exemplary methods and apparatus may comprise a plurality of first Kalman filters 100, 300, 400, each implementing a different state model and/or determining the a posteriori estimate of the state vector based on different sets of GNSS measurements.

For example, a separate Kalman filter can be used to determine carrier range ambiguity values for each of a plurality of GNSS constellations. Alternatively or in addition, separate Kalman filters can be configured to use different estimation strategies when estimating the carrier range ambiguity values. For example, one Kalman filter may use an aggressive estimation strategy and another may use a more conservative estimation strategy.

The measurement update module 118, 318, 418 etc. of the second Kalman filter 102, 302, 402 etc. may receive carrier range ambiguity data based on all of the different estimations of the carrier range ambiguity. The measurement update module of the second Kalman filter may compare all the estimates of carrier range ambiguities for consistency and not use any that appear incorrect. Alternatively, the measurement update module of the second Kalman filter may weight each of the estimations of carrier range ambiguities when using them to determine the a posteriori estimate of the second state vector.

A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The skilled person will be able to envisage other embodiments without departing from the scope of the appended claims.

The invention claimed is:

1. An apparatus for determining navigation data using carrier range measurements obtained by a GNSS receiver for a plurality of GNSS satellites, the apparatus comprising:
a first Kalman filter configured to determine an a posteriori estimate of a first state vector based at least in part on a first set of GNSS measurements obtained by the, and/or a further, GNSS receiver and an a priori estimate of the first state vector, the first state vector comprising carrier range ambiguity values relating to the plurality of GNSS satellites and a position of the, and/or the further, GNSS receiver; and
a second Kalman filter configured to determine an a posteriori estimate of a second state vector, which comprises the navigation data, based at least in part on a second set of GNSS measurements obtained by the, and/or a further, GNSS receiver, an a priori estimate of the second state vector, and carrier range ambiguity data based on the carrier range ambiguity values determined in the a posteriori estimate of the first state vector.

2. The apparatus according to claim 1, wherein the first Kalman filter is configured to determine the a priori estimate of the first state vector based on at least one of a velocity estimate for the, and/or the further, GNSS receiver and a measure of uncertainty relating to the velocity estimate, each determined by the second Kalman filter.

3. The apparatus according to claim 2, wherein the second Kalman filter is configured to determine the velocity estimate and/or the measure of uncertainty based on data obtained by one or more sensors and that is indicative of motion and/or orientation of the, and/or the further, GNSS receiver.

4. The apparatus according to claim 2, wherein the second Kalman filter is configured to determine the velocity estimate and/or the measure of uncertainty based on the a priori estimate of the second state vector and one or more measurements obtained by one or more sensors and indicative of a speed of the, or the further, GNSS receiver.

5. The apparatus according to claim 1, wherein, when determining the a posteriori estimate of the first state vector, the first Kalman filter is configured to determine estimated first measurement residuals for the first Kalman filter based on second measurement residuals for the second Kalman filter.

6. The apparatus according to claim 5, wherein the first Kalman filter is further configured to estimate the first measurement residuals based on Kalman filter parameters of the second Kalman filter, at least part of the a priori estimate of the second state vector and at least part of the a priori estimate of the first state vector.

7. The apparatus according to claim 1, wherein the first Kalman filter is configured to determine the a posteriori estimate of the first state vector at a first update rate, and wherein the second Kalman filter is configured to determine the a posteriori estimate of the second state vector at a second update rate.

8. The apparatus according to claim 7, wherein the second update rate is greater than the first update rate.

9. The apparatus according to claim 1, wherein the second Kalman filter is configured to determine the a priori estimate of the second state vector based on inertial measurements obtained by one or more inertial sensors and indicative of acceleration and/or angular rate of rotation of the, or the further, GNSS receiver.

10. The apparatus according to claim 1, wherein one of the first or second sets of GNSS measurements comprise at least one GNSS measurement not included in the other of the first or second sets of GNSS measurements.

11. The apparatus according to claim 1, comprising two GNSS receivers, and wherein the first and second sets of GNSS measurements each comprise GNSS measurements obtained by the two GNSS receivers.

12. The apparatus according to claim 1, further comprising first and second processors, wherein the first processor is configured to implement the first Kalman filter and the second processor is configured to implement the second Kalman filter.

13. The apparatus according to claim 1, further comprising an ambiguity resolution module configured to resolve the carrier range ambiguity values determined in the a posteriori estimate of the first state vector to integers, and wherein the carrier range ambiguity data comprises the resolved integer carrier range ambiguity values.

14. The apparatus according to claim 1, wherein the first state vector comprises atmospheric correction values relating to the plurality of GNSS satellites.

15. The apparatus according to claim 14, wherein the carrier range ambiguity data comprises the carrier range ambiguity values and the atmospheric correction values, and wherein the second Kalman filter is configured to adjust the carrier range ambiguity values based on the atmospheric correction values.

16. The apparatus according to claim 14, wherein the first Kalman filter is configured to adjust the carrier range ambiguity values based on the atmospheric correction values, and wherein the carrier range ambiguity data comprises the adjusted carrier range ambiguity values.

17. The apparatus according to claim 1, further comprising one or more further Kalman filters configured to determine an a posteriori estimate of one or more further state vectors based at least in part on further GNSS measurements obtained by the, and/or a further, GNSS receiver and one or more a priori estimates of the one or more further state vectors, the one or more further state vectors comprising further carrier range ambiguity values relating to the plurality of GNSS satellites, and wherein the carrier range ambiguity data is also based on the further carrier range ambiguity values.

18. A method for determining navigation data using carrier range measurements obtained by a GNSS receiver for a plurality of GNSS satellites, the method comprising:

determining, by a first Kalman filter an a posteriori estimate of a first state vector based at least in part on a first set of GNSS measurements obtained by the, and/or a further, GNSS receiver and an a priori estimate of the first state vector, the first state vector comprising carrier range ambiguity values relating to the plurality of GNSS satellites and a position of the, and/or the further, GNSS receiver; and determining, by a second Kalman filter an a posteriori estimate of a second state vector, which comprises the navigation data, based at least in part on a second set of GNSS measurements obtained by the, and/or a further, GNSS receiver, an a priori estimate of the second state vector, and carrier range ambiguity data based on the carrier range ambiguity values determined in the a posteriori estimate of the first state vector.

19. A non-transitory computer-readable storage medium storing instructions for determining navigation data using carrier range measurements obtained by a GNSS receiver for a plurality of GNSS satellites, the instructions when executed by one or more processors, cause the one or more processors to perform operations comprising:

determining, by a first Kalman filter an a posteriori estimate of a first state vector based at least in part on a first set of GNSS measurements obtained by the, and/or a further, GNSS receiver and an a priori estimate of the first state vector, the first state vector comprising carrier range ambiguity values relating to the plurality of GNSS satellites and a position of the, and/or the further, GNSS receiver; and determining, by a second Kalman filter an a posteriori estimate of a second state vector, which comprises the navigation data, based at least in part on a second set of GNSS measurements obtained by the, and/or a further, GNSS receiver, an a priori estimate of the second state vector, and carrier range ambiguity data based on the carrier range ambiguity values determined in the a posteriori estimate of the first state vector.

* * * * *